(12) United States Patent
Bosma

(10) Patent No.: US 7,198,002 B2
(45) Date of Patent: Apr. 3, 2007

(54) METHOD AND AN ARRANGEMENT FOR FILTERING MILK

(75) Inventor: Epke Bosma, Tumba (SE)

(73) Assignee: Delaval Holding AB, Tumba (SE)

( * ) Notice: Subject to any disclaimer, the term of this patent is extended or adjusted under 35 U.S.C. 154(b) by 38 days.

(21) Appl. No.: 10/471,178

(22) PCT Filed: Mar. 15, 2002

(86) PCT No.: PCT/SE02/00498

§ 371 (c)(1),
(2), (4) Date: Mar. 1, 2004

(87) PCT Pub. No.: WO02/074070

PCT Pub. Date: Sep. 26, 2002

(65) Prior Publication Data

US 2004/0123807 A1    Jul. 1, 2004

(30) Foreign Application Priority Data

Mar. 16, 2001  (SE) .................................... 0100936

(51) Int. Cl.
*A01J 11/06*    (2006.01)
(52) U.S. Cl. ................................................ 119/14.18
(58) Field of Classification Search ............. 119/14.18
See application file for complete search history.

(56) References Cited

U.S. PATENT DOCUMENTS 4,236,075 A * 11/1980 Nexo et al. ................. 250/343
4,610,786 A * 9/1986 Pearson ....................... 210/236
5,151,186 A * 9/1992 Yoo et al. .................... 210/541
5,462,653 A * 10/1995 Hills ............................ 210/85
5,850,845 A  12/1998 Pereira et al.
6,490,782 B1 * 12/2002 Duckett ....................... 29/714
6,890,491 B1 * 5/2005 Feygin et al. ............... 422/130

FOREIGN PATENT DOCUMENTS

| DE | 806067 | 6/1951 |
| DE | 4040024 A1 * | 6/1992 |
| DE | 10046277 | 4/2002 |
| EP | 0084520 | 7/1983 |
| EP | 0653153 | 5/1995 |
| EP | 0951822 | 10/1999 |
| WO | 9828969 | 7/1998 |

OTHER PUBLICATIONS

Derwent's Abstract, No. 95-96663/13, Week 9513, Jul. 15, 1994, 91SU-4953850.

* cited by examiner

*Primary Examiner*—Teri Pham Luu
*Assistant Examiner*—Susan C. Alimenti
(74) *Attorney, Agent, or Firm*—Harness, Dickey & Pierce, P.L.C.

(57) ABSTRACT

The present invention provides an arrangement for filtering milk in a milking system, wherein said arrangement comprises a movable filter magazine provided with at least three filter devices (8), each of which comprises a tube housing a disposable filter and a support structure for supporting the disposable filter, and each of which is connectable to said milking system for filtering milk therein; and an actuating device for connecting each of said at least three filter devices, one at a time, to said milking system.

9 Claims, 3 Drawing Sheets

METHOD AND AN ARRANGEMENT FOR FILTERING MILK

FIELD OF INVENTION

The present invention relates generally to dairy farming and particularly to an arrangement and a method, respectively, for filtering milk in a milking system.

BACKGROUND

There are many duties to carry out on a dairy farm and some of these have to be carried out on specific times. For instance, when milk has been collected from a milk storage tank by a milk lorry, e.g. every second day, the milk storage tank has to be cleaned. Suitably, the rest of the milking system is then cleaned along with the milk storage tank.

Due to hygienic requirements the milking system comprises a milk filter, which milk filter further has to be cleaned or replaced by a new milk filter regularly, generally, three times per day and night. Suitably, the milk filter is renewed or replaced when the milking system has been cleaned. As the milk filter is renewed or replaced regularly, some of the renewals or replacements will need to be carried out at odd working hours, e.g. during the night.

It is therefore desirable to perform the renewal or replacement of the filter at least partially automatically such that the operator of the milking system need not attend the milking system during these odd working hours.

In EP 0653153 A1 a milking machine is disclosed provided with one or more filtration devices, each being provided with a filter, for filtering milk. When the milking machine is cleaning a cleaning liquid is led through a filter in a direction opposite to that in which the milk passes during filtration. A disadvantage of such a filtration device is that the back flush cleaning involves risks of catching dirt in the filter, which thereafter may come loose during milking and contaminate the milk.

Further, EP 0653153 A1 describes that several filter devices, connected by a piping, may be used, wherein one filter device may be renewed while another one is used for filtering milk. A disadvantage of such an arrangement is that the piping connecting the filters necessarily include corners, branches and recesses, may be difficult to clean. Further, such filter devices have to be renewable, and thus disposable filters are not suitable to be used.

SUMMARY OF THE INVENTION

An object of the present invention is to provide an arrangement and a method, respectively, for filtering milk in a milking system, which allow an operator of the milking system to change disposable filters in a milking system only once per day and night, suitably at a time convenient to the operator.

This object, among others, is according to the present invention attained by arrangements and methods, respectively, as defined in the appended claims.

Further features and advantages of the present invention will be evident from the following description.

BRIEF DESCRIPTION OF THE DRAWINGS

The present invention will become more fully understood from the detailed description of preferred embodiments given below and the accompanying FIGS. 1–6, which are given by way of illustration only, and thus, are not limitative of the present invention, wherein.

DETAILED DESCRIPTION OF EMBODIMENTS

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details.

A first embodiment of the present invention will now be described with reference to FIGS. 1–4.

Figure 1:
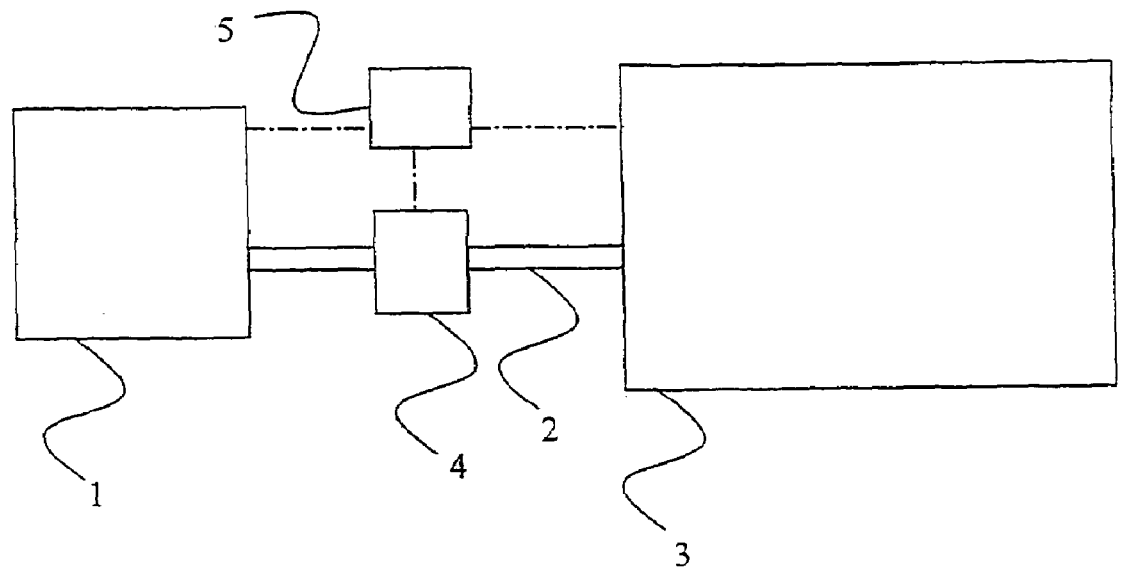
FIG. 1 shows schematically a milking system including a filter arrangement according to the present invention.

An automatic milking system, as shown in FIG. 1, comprises a milking robot 1; a milk storage tank 3; a milk line 2 connecting the milking robot 1 with the milk storage tank 3; a filter arrangement 4 for filtering milk in said milking system; and a controller 5 for controlling the milking system, e.g. controlling cleaning of the milking system.

The milking robot 1 is adapted for automatic milking of animals, such as cows. Milk thus extracted by the milking robot 1 is transported in the milk line 2 to the milk storage tank 3 by means of a pump (not illustrated) or similar. The milk is suitably filtered in the filter arrangement 4 while being transported in the milk line 2.

Figure 2:
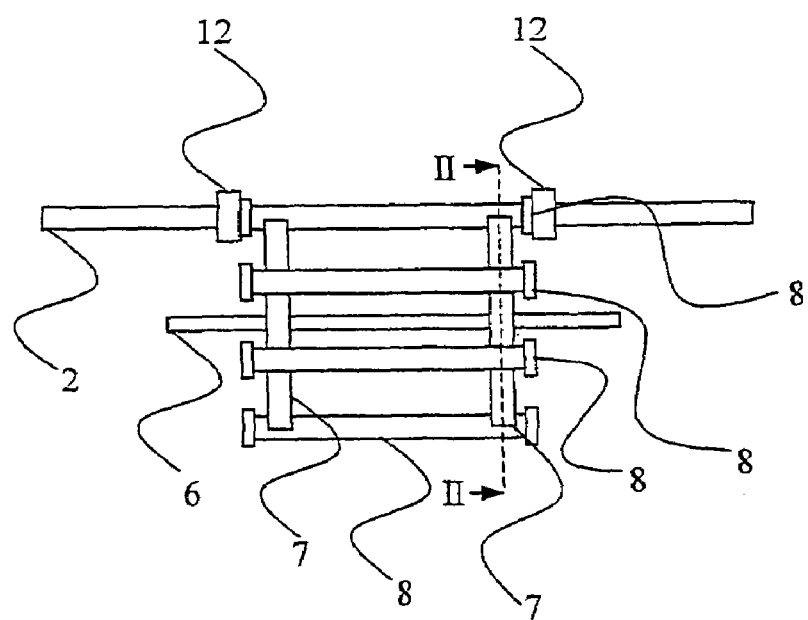
FIG. 2 illustrates a filter arrangement including a revolver filter magazine according to a first embodiment of the present invention.
Figure 3:
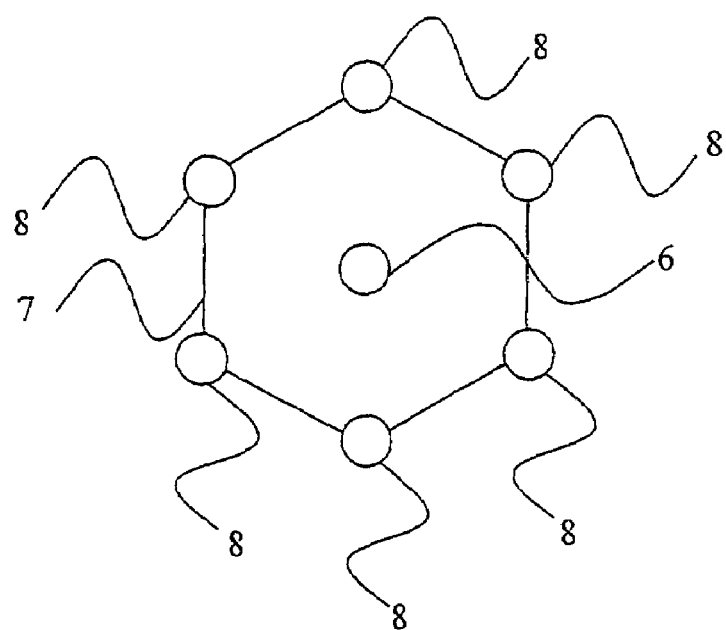
FIG. 3 illustrates a cut along the line II—II of FIG. 2.

The filter arrangement 4, illustrated more in detail in FIGS. 2 and 3, comprises a movable filter magazine including a central shaft 6, and two circular support plates 7. The magazine can be loaded with up to six filter devices 8, each of which comprises a tube housing a disposable filter, such as a filter sock, and a support structure for supporting the filter sock.

Figure 4:
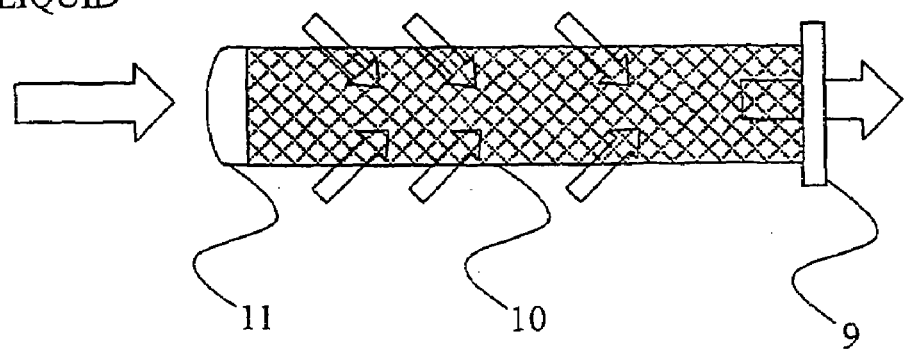
FIG. 4 shows a support structure for a filter sock of a filter device suitable to be used with the present invention.

The support structure, illustrated in detail in FIG. 4, is adapted to support a filter sock (not shown), which suitably is thread over the support structure. The support structure comprises a ring-shaped support 9 for engagement with the tube of the filter device 8 and a coarse cylindrical mesh 10 or similar attached to the ring-shaped support 9.

At the end of the coarse cylindrical mesh 10, which faces the incoming flow during filtration, is provided with a plate 11. Firstly, such plate provides a good support for the filter sock, and secondly it forces the milk or cleaning fluid to flow over the whole mesh, thereby obtaining an excellent filter capability.

A tubular member (not shown) may be arranged around the coarse mesh 10 at the other end thereof, i.e. adjacent to the ring-shaped support 9. Hereby, a dirt trap is formed by the volume delimited by the ring-shaped support 9, the tubular member and the tube. Two small opposite holes is provided in the tubular member adjacent the ring-shaped support 9 such that a small flow out of the dirt trap is obtained.

Thus, dirt, which is filtered out and transported by the flow of the milk or cleaning fluid along the filter sock, is collected in the dirt trap and does stop up the filter.

The six filter devices 8 are positioned symmetrically around the shaft 6. The two plates 7 supports the six filter devices 8 in their respective ends. The shaft 6 is connected to the two plates 7, such that a revolving motion of the shaft 6 revolves the six filter devices 8.

Each of the six filter devices 8 is connectable in the milk line 2 of the milking system, by moving the movable filter magazine.

An actuating device (not illustrated), such as an electric motor, is controlled by the controller to revolve the movable filter magazine stepwise.

A pneumatic or electric arrangement, also controllable by the controller 5, locks a filter device 8 in the milk line 2 by means of two pipe couplings 12 in a fluid-tight manner, such that a filter device 8 connected to the milk line, can be used to filter milk transported in the milk line 2 without any leakage.

When it is suitable to change filter in the milking system, e.g. due to the hygienic requirements, the filter device 8 connected to the milk line 2 is unlocked by the electric or pneumatic arrangement, and is removed from the milk line 2 by revolving the movable filter magazine as performed by the actuating device, and another filter device 8 from the movable filter magazine is positioned in the milk line 2, and locked to the milk line 2 by the electric or pneumatic arrangement.

A sensor (not illustrated), such as an inductive sensor, may be used to detect the positions of the filter devices 8 in the movable filter magazine, e.g. to ensure that a filter device to be connected in the milk line 2 is in alignment therewith.

The sensor may be further used to detect the position of a particularly marked filter device. That position may be used to indicate when all the filter socks in the movable filter magazine have been used for filtering, e.g. by positioning the movable filter magazine after change of filter socks in all filter devices 8 such that the particularly marked filter device is detected when the movable filter magazine has revolved a complete revolution.

The above-described embodiment, being provided with six filter devices 8, generally requires a change of disposable filters only once every second day since the hygienic requirements prescribe change of filter socks three times per day and night. There is, however, a plurality of variations of the inventive filter arrangement, of which some are presented below.

If the milking system comprises a plate cooler (not illustrated) for pre-cooling of the milk, it is advisable to have a filter sock in the milking line both during milking and during cleaning of the milking system. It is usually adequate to use the same filter sock used during milking also during cleaning. If, however, an improved cleaning is desired, an unused filter sock may be utilized in the filter device during cleaning.

Furthermore, improved filtering may be achieved by changing filter socks more often than required.

If the milking system does not comprise a plate cooler, it is advisable to clean the milking system without any filter sock or support structure present in the filter device since a larger cleaning flow may then be obtained.

A movable filter magazine provided with three filter devices is typically sufficient for change of the disposable filters only once per day and night in a milking system.

A movable filter magazine provided with three filter devices, each including a tube housing a filter sock and a support structure, and one filter device including an empty tube (i.e. a dummy filter device) is sufficient for filtering milk three times and cleaning three times without a filter sock and a support structure present in the filter device. The controller 5 controls the connection/disconnection of the filter devices 8 such that the filter device including the empty tube is connected to the milking system while cleaning is performed, and the three filter devices 8 provided with a respective filter sock are alternately connected to the milking system such that milk is filtered through a clean filter sock when three cleanings have been performed. Change of the disposable filters of the filter devices in the movable filter magazine is then necessary.

Alternative, a magazine may be provided with three filter devices 8, each including a tube housing a filter sock and a support structure, and three dummy filter devices 8, each including an empty tube, positioned alternately such that each filter device having a disposable filter neighbors two dummy filter devices. Hereby, the actuating device only needs to move the filter devices 8 a single step (i.e. a rotation of one sixth of a full revolution) to connect a filter device provided with a clean filter sock for filtering of milk subsequent to the cleaning of the milking system where a dummy filter device is connected in the milk line.

When it is time to change filter socks of the filter devices in the movable filter magazine, e.g. as indicated by a signal generated by the above-described sensor, or generated due to the period of time lapsed since the last change of filter socks having reached a threshold value, the operator removes the filter socks of the disconnected filter devices and provides the disconnected filter devices with clean filter socks. The movable filter magazine is then manually rotated one position, such that a filter device 8 including a clean filter sock is connected to the milk line 2. The filter sock of the last filter device is thereafter disposed of and replaced with a new clean one.

At the change of the filter socks, i.e. when the filter socks are removed, the tubes and support structures may be cleaned.

Two lids (not illustrated) may be positioned to cover the ends of the filter devices 8 not connected to the milk line 2, to prevent dirt from entering the tubes and the filter socks.

Alternatively, a protecting housing (not illustrated) may be provided for housing the whole filter arrangement 4, and thus dirt is prevented from entering the filter devices and contaminate the same.

Figure 5:
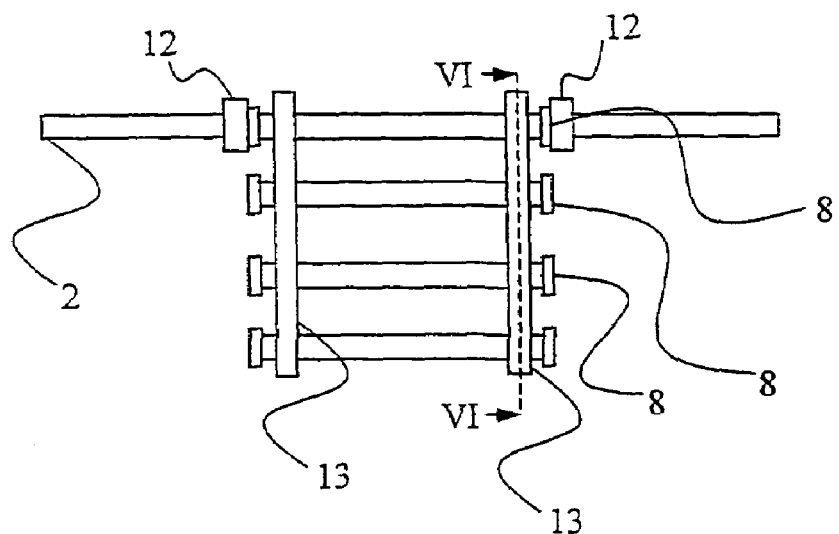
FIG. 5 illustrates a filter arrangement including a linear filter magazine according to a second embodiment of the present invention.
Figure 6:
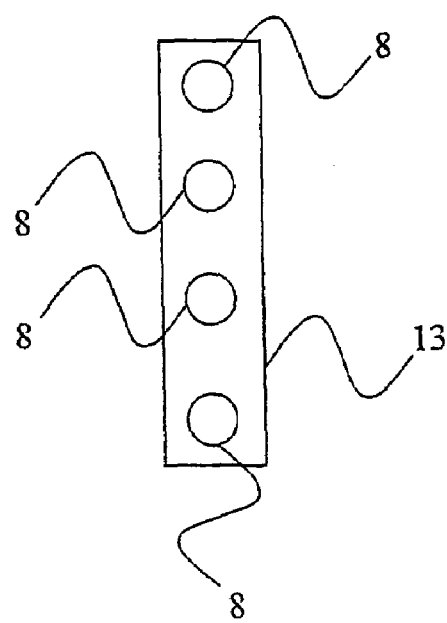
FIG. 6 illustrates a cut along the line VI—VI of FIG. 5.

A second embodiment of the present invention will now be described with reference to FIGS. 5 and 6.

In this embodiment the movable filter magazine is a linear magazine, i.e. the filter devices 8 are arranged along a line therein and are supported by two support plates 13. An actuating device (not illustrated) is provided for linear movement of the movable filter magazine, such that the filter devices 8 in the movable filter magazine can be connected, one at a time, in the milk line 2 of the milking system of FIG. 1, by means of two pipe couplings 12.

In other respects this embodiment does not differ from the previous embodiment. Particularly, the discussion regarding the number of filter devices and the number of filter devices for cleaning purposes (i.e. filter devices including an empty tube) to be used is equally applicable as regards this second embodiment.

The second embodiment of the present invention may easily be fully automated by providing means (e.g. transport bands, robot arms, etc.) for removing used filter socks from the movable filter magazine and for arranging clean filter socks at empty positions of the movable filter magazine.

It will be obvious that the present invention may be varied in a plurality of ways. All such variations as would be obvious for a person skilled in the art are intended to be included within the scope of the present invention.

The invention claimed is:

1. An arrangement for filtering milk in a milking system, said arrangement comprises:
    a movable filter magazine provided with at least three filter devices, each of which includes a tube housing a disposable filter and a support structure for supporting the disposable filter, and each of which is connectable in said milking system for filtering milk therein while said filter device is positioned in said filter magazine; and
    an actuating device for connecting each of said at least three filter devices, one at a time, in said milking system for filtering milk therein, by moving said movable filter magazine.

2. The arrangement as claimed in claim 1 wherein said movable filter magazine is a revolver magazine, which is rotatably movable.

3. The arrangement as claimed in claim 1 wherein said movable filter magazine is elongated, said at least three filter devices are arranged along a line in said movable filter magazine and said movable filter magazine is linearly movable.

4. The arrangement as claimed in claim 1 wherein said movable filter magazine is provided with a fourth filter device comprising an empty tube, said fourth filter device is connectable in said milking system for cleaning the milking system, and said actuating device is adapted to connect said fourth filter device in said milking system while disconnecting one of said at least three filter devices by moving said movable filter magazine.

5. The arrangement as claimed in claim 4 wherein said movable filter magazine is provided with a fifth filter device and a sixth filter device, each of which comprises an empty tube, and each of which is connectable in said milking system for cleaning the milking system, and said actuating device is adapted to connect said fifth and sixth filter devices, one at a time, in said milking system while disconnecting a respective one of said at least three filter devices by moving said movable filter magazine.

6. The arrangement as claimed in claim 1 wherein said movable filter magazine is provided with a fourth, fifth, and sixth filter devices, each of which comprises a tube housing, a disposable filter and a support structure for supporting the disposable filter, and each of which is connectable to said milking system for filtering milk in the milking system, and said actuating device is adapted to connect said fourth, fifth and sixth filter devices, one at a time, in said milking system for filtering milk therein while disconnecting a respective one of said at least three filter devices by moving said movable filter magazine.

7. The arrangement as claimed in claim 1 wherein said disposable filter is a filter sock.

8. The arrangement as claimed in claim 1 comprising a sensor for detecting a position of one of said filter devices in said movable filter magazine.

9. The arrangement as claimed in claim 8 wherein said sensor is further adapted for detecting the position of a particularly marked filter device.

* * * * *